: US 12,016,035 B2
(45) Date of Patent: Jun. 18, 2024

(54) USER EQUIPMENT AND BASE STATION DEVICE

(71) Applicant: NTT DOCOMO, INC., Tokyo (JP)

(72) Inventors: Hideaki Takahashi, Tokyo (JP); Yuki Matsumura, Tokyo (JP); Kazuki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 339 days.

(21) Appl. No.: 17/441,172

(22) PCT Filed: Mar. 27, 2019

(86) PCT No.: PCT/JP2019/013469
§ 371 (c)(1),
(2) Date: Sep. 20, 2021

(87) PCT Pub. No.: WO2020/194638
PCT Pub. Date: Oct. 1, 2020

(65) Prior Publication Data
US 2022/0167322 A1 May 26, 2022

(51) Int. Cl.
*H04W 72/23* (2023.01)

(52) U.S. Cl.
CPC .................................. *H04W 72/23* (2023.01)

(58) Field of Classification Search
CPC ...................................................... H04W 72/23
See application file for complete search history.

(56) References Cited

U.S. PATENT DOCUMENTS

2020/0267734 A1* 8/2020 Khoshnevisan ...... H04W 80/02

FOREIGN PATENT DOCUMENTS

EP 3833081 A1 * 6/2021 ........... H04B 7/0695

OTHER PUBLICATIONS

International Search Report issued in PCT/JP2019/013469 dated May 28, 2019 (5 pages).
Written Opinion of the International Searching Authority issued in PCT/JP2019/013469 dated May 28, 2019 (5 pages).
Intel Corporation; "Discussion on multi-TRP/multi-panel transmission"; 3GPP TSG RAN WG1 Meeting #94bis, R1-1810790; Chengdu, China; Oct. 8-12, 2018 (10 pages).
3GPP TS 38.214 V15.4.0; "3rd Generation Partnership Project; Technical Specification Group Radio Access Network; NR; Physical layer procedures for data (Release 15)" Dec. 2018 (102 pages).

(Continued)

*Primary Examiner* — Samina F Choudhry
(74) *Attorney, Agent, or Firm* — Osha Bergman Watanabe & Burton LLP

(57) ABSTRACT

A user equipment includes a receiving unit that receives information related to a transmission configuration state of a downlink shared channel from a base station device, a control unit that individually applies a configuration related to quasi co-location (QCL) to each of the downlink shared channels transmitted from a plurality of transmission reception points (TRPs) or panels, based on the information related to the transmission configuration state, and a communication unit that performs communication via the downlink shared channel to which the configuration related to the plurality of QCLs is individually applied.

5 Claims, 10 Drawing Sheets

(56) References Cited

OTHER PUBLICATIONS

3GPP TS 38.300 V15.4.0; "3rd Generation Partnership Project; Technical Specification Group Radio Access Network; NR; NR and NG-RAN Overall Description; Stage 2 (Release 15)" Dec. 2018 (97 pages).
3GPP TS 38.321 V15.4.0; "3rd Generation Partnership Project; Technical Specification Group Radio Access Network; NR; Medium Access Control (MAC) protocol specification (Release 15)" Dec. 2018 (77 pages).
Office Action issued in counterpart Chinese Patent Application No. 201980094390.4 dated Jun. 7, 2023 (21 pages).
NTT Docomo, Inc.; "Enhancements on multi-TRP/panel transmission"; 3GPP TSG RAN WG1 #96, R1-1902812; Athens, Greece; Feb. 25-Mar. 1, 2019 (6 pages).
Office Action issued in counterpart Chinese Patent Application No. 201980094390.4 mailed Nov. 22, 2023 (14 pages).

\* cited by examiner

FIG.6

| Oct 1 | R | Serving Cell ID | | | | | | BWP ID |
|---|---|---|---|---|---|---|---|---|
| Oct 2 | T₇ | T₆ | T₅ | T₄ | T₃ | T₂ | T₁ | T₀ |
| Oct 3 | T₁₅ | T₁₄ | T₁₃ | T₁₂ | T₁₁ | T₁₀ | T₉ | T₈ |
| ⋮ | | | | | | | | |
| Oct N | T(N−2)×8+7 | T(N−2)×8+6 | T(N−2)×8+5 | T(N−2)×8+4 | T(N−2)×8+3 | T(N−2)×8+2 | T(N−2)×8+1 | T(N−2)×8 |
| Oct N+1 (For DCI codepoint 000) | AT₇ | AT₆ | AT₅ | AT₄ | AT₃ | AT₂ | AT₁ | AT₀ |
| Oct N+2 (For DCI codepoint 001) | AT₇ | AT₆ | AT₅ | AT₄ | AT₃ | AT₂ | AT₁ | AT₀ |
| ⋮ | | | | | | | | |
| Oct N+8 (For DCI codepoint 111) | AT₇ | AT₆ | AT₅ | AT₄ | AT₃ | AT₂ | AT₁ | AT₀ |

FIG.7

| R | Serving Cell ID | | | BWP ID | | | | Oct 1 |
|---|---|---|---|---|---|---|---|---|
| R | R | R | R | DCI codepoint | | | P | Oct 2 |
| T7 | T6 | T5 | T4 | T3 | T2 | T1 | T0 | Oct 3 |
| T15 | T14 | T13 | T12 | T11 | T10 | T9 | T8 | Oct 4 |

...

| T(N−3)×8+7 | T(N−3)×8+6 | T(N−3)×8+5 | T(N−3)×8+4 | T(N−3)×8+3 | T(N−3)×8+2 | T(N−3)×8+1 | T(N−3)×8 | Oct N |
|---|---|---|---|---|---|---|---|---|

...

| T7 | T6 | T5 | T4 | T3 | T2 | T1 | T0 |
|---|---|---|---|---|---|---|---|
| T15 | T14 | T13 | T12 | T11 | T10 | T9 | T8 |

...

| T(N−3)×8+7 | T(N−3)×8+6 | T(N−3)×8+5 | T(N−3)×8+4 | T(N−3)×8+3 | T(N−3)×8+2 | T(N−3)×8+1 | T(N−3)×8 |
|---|---|---|---|---|---|---|---|

...

| R | R | R | R | DCI codepoint | | | P | Up to 8 DCI codepoints |
|---|---|---|---|---|---|---|---|---|
| T7 | T6 | T5 | T4 | T3 | T2 | T1 | T0 | |
| T15 | T14 | T13 | T12 | T11 | T10 | T9 | T8 | |

...

| T(N−3)×8+7 | T(N−3)×8+6 | T(N−3)×8+5 | T(N−3)×8+4 | T(N−3)×8+3 | T(N−3)×8+2 | T(N−3)×8+1 | T(N−3)×8 |
|---|---|---|---|---|---|---|---|

...

| T7 | T6 | T5 | T4 | T3 | T2 | T1 | T0 |
|---|---|---|---|---|---|---|---|
| T15 | T14 | T13 | T12 | T11 | T10 | T9 | T8 |

...

| T(N−3)×8+7 | T(N−3)×8+6 | T(N−3)×8+5 | T(N−3)×8+4 | T(N−3)×8+3 | T(N−3)×8+2 | T(N−3)×8+1 | T(N−3)×8 |
|---|---|---|---|---|---|---|---|

FIG.8

| R | Serving Cell ID | | | | | BWP ID | | Oct 1 |
|---|---|---|---|---|---|---|---|---|
| R | R | R | R | R | DCI codepoint | | | Oct 2 |
| $T_7$ | $T_6$ | $T_5$ | $T_4$ | $T_3$ | $T_2$ | $T_1$ | $T_0$ | Oct 3 |
| $T_{15}$ | $T_{14}$ | $T_{13}$ | $T_{12}$ | $T_{11}$ | $T_{10}$ | $T_9$ | $T_8$ | Oct 4 |

...

| $T_{(N-3)\times 8+7}$ | $T_{(N-3)\times 8+6}$ | $T_{(N-3)\times 8+5}$ | $T_{(N-3)\times 8+4}$ | $T_{(N-3)\times 8+3}$ | $T_{(N-3)\times 8+2}$ | $T_{(N-3)\times 8+1}$ | $T_{(N-3)\times 8}$ | Oct N |
|---|---|---|---|---|---|---|---|---|

...

| R | R | R | R | R | DCI codepoint | | |
|---|---|---|---|---|---|---|---|
| $T_7$ | $T_6$ | $T_5$ | $T_4$ | $T_3$ | $T_2$ | $T_1$ | $T_0$ |
| $T_{15}$ | $T_{14}$ | $T_{13}$ | $T_{12}$ | $T_{11}$ | $T_{10}$ | $T_9$ | $T_8$ |

Up to 8 DCI codepoints

...

| $T_{(N-3)\times 8+7}$ | $T_{(N-3)\times 8+6}$ | $T_{(N-3)\times 8+5}$ | $T_{(N-3)\times 8+4}$ | $T_{(N-3)\times 8+3}$ | $T_{(N-3)\times 8+2}$ | $T_{(N-3)\times 8+1}$ | $T_{(N-3)\times 8}$ |
|---|---|---|---|---|---|---|---|

FIG.9

| R | Serving Cell ID | | | | | BWP ID | | Oct 1 |
|---|---|---|---|---|---|---|---|---|
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |

...

| $T_{(N-2) \times 8+7}$ | $T_{(N-2) \times 8+6}$ | $T_{(N-2) \times 8+5}$ | $T_{(N-2) \times 8+4}$ | $T_{(N-2) \times 8+3}$ | $T_{(N-2) \times 8+2}$ | $T_{(N-2) \times 8+1}$ | $T_{(N-2) \times 8}$ | Oct N |

...

| $T_{M,7}$ | $T_{M,6}$ | $T_{M,5}$ | $T_{M,4}$ | $T_{M,3}$ | $T_{M,2}$ | $T_{M,1}$ | $T_{M,0}$ | Up to 8 DCI codepoints |
|---|---|---|---|---|---|---|---|---|
| $T_{M,15}$ | $T_{M,14}$ | $T_{M,13}$ | $T_{M,12}$ | $T_{M,11}$ | $T_{M,10}$ | $T_{M,9}$ | $T_{M,8}$ | |

...

| $T_{M,(N-2) \times 8+7}$ | $T_{M,(N-2) \times 8+6}$ | $T_{M,(N-2) \times 8+5}$ | $T_{M,(N-2) \times 8+4}$ | $T_{M,(N-2) \times 8+3}$ | $T_{M,(N-2) \times 8+2}$ | $T_{M,(N-2) \times 8+1}$ | $T_{M,(N-2) \times 8}$ |

# USER EQUIPMENT AND BASE STATION DEVICE

TECHNICAL FIELD

The present invention relates to a user equipment and a base station device in a wireless communication system.

BACKGROUND ART

In New Radio (NR) (also referred to as "5G") which is a successor system of Long Term Evolution (LTE), a technology satisfying a large-capacity system, a high-speed data transmission rate, a low delay, simultaneous connection of multiple terminals, a low cost, power saving, and the like is under review (for example, Non-Patent Document 1).

In an NR wireless communication system, an indication of information indicating a transmission configuration indicator state (TCI state) applied to downlink signal transmission is given from a base station device to a user equipment. The TCI state is information related to quasi co-location (QCL) and corresponds to, for example, a spatial reception parameter of an antenna port. The user equipment applies the TCI state and receives a downlink signal transmitted from the base station device (for example, Non-Patent Document 2).

CITATION LIST

Non-Patent Document

Non-Patent Document 1: 3GPP TS 38.300 V15.4.0 (2018-12)
Non-Patent Document 2: 3GPP TS 38.321 V15.4.0 (2018-12)
Non-Patent Document 3: 3GPP TS 38.214 V15.4.0 (2018-12)

SUMMARY OF THE INVENTION

Problem to be Solved by the Invention

In the NR wireless communication system, an extension function of multiple-input and multiple-output (MIMO) is under review. The extension function of MIMO includes, for example, transmission in which a plurality of transmission reception points (TRPs) or panels are used. Here, there are cases in which configurations related to the QCL on a reception side device for each TRP or panel are not properly executed depending on a format of a control signal.

The present invention was made in light of the foregoing, and it is an object of the present invention to perform configurations of communication in which a plurality of TRPs or panels are used in a wireless communication system.

Means for Solving Problem

According to the disclosed technique, a user equipment including a receiving unit that receives information related to a transmission configuration state of a downlink shared channel from a base station device, a 0139control unit that individually applies a configuration related to quasi co-location (QCL) to each of the downlink shared channels transmitted from a plurality of transmission reception points (TRPs) or panels on the basis of the information related to the transmission configuration state, and a communication unit that performs communication via the downlink shared channel to which the configurations related to the plurality of QCLs is individually applied is provided.

Effect of the Invention

According to the disclosed technology, it is possible to perform configurations of communication in which a plurality of TRPs or panels are used in a wireless communication system.

BRIEF DESCRIPTION OF DRAWINGS

FIG. 6 illustrates a specification change example (2) related to an operation example in an embodiment of the present invention;
FIG. 7 illustrates a specification change example (3) related to an operation example in an embodiment of the present invention;
FIG. 8 illustrates a specification change example (4) related to an operation example in an embodiment of the present invention;
FIG. 9 illustrates a specification change example (5) related to an operation example in an embodiment of the present invention.

MODE(S) FOR CARRYING OUT THE INVENTION

Hereafter, exemplary embodiments of the present invention will be described with reference to the appended drawings. Embodiments to be described below are an example, and embodiments to which the present invention is applied are not limited to the following embodiments.

The existing technology is appropriately used for an operation of a wireless communication system of an embodiment of the present invention. Here, the existing technology is, for example, the existing LTE but is not limited to the existing LTE. The term "LTE" used in this specification has a broad meaning including LTE-Advanced and schemes after LTE-Advanced (for example, NR) unless otherwise specified.

Also, in an embodiment of the present invention to be described below, terms such as a synchronization signal (SS), a primary SS (PSS), a secondary SS (SSS), a physical broadcast channel (PBCH), and a physical random access channel (PRACH) used in the existing LTE are used. This is for convenience of description, and signals, functions, or the like similar to them may be indicated by other names. The above terms in NR correspond to NR-SS, NR-PSS, NR-SSS, NR-PBCH, NR-PRACH, and the like. However, even a signal used for NR is not always indicated by "NR-."

Also, in an embodiment of the present invention, a duplex scheme may be a Time Division Duplex (TDD) scheme, may be a Frequency Division Duplex (FDD) scheme, or may be other schemes (for example, Flexible Duplex or the like).

Further, in an embodiment of the present invention, when a radio parameter or the like is "configured", it may mean that a predetermined value is pre-configured or may mean that a radio parameter indicated by a base station device 10 or a user equipment 20 may be configured.

Figure 1:
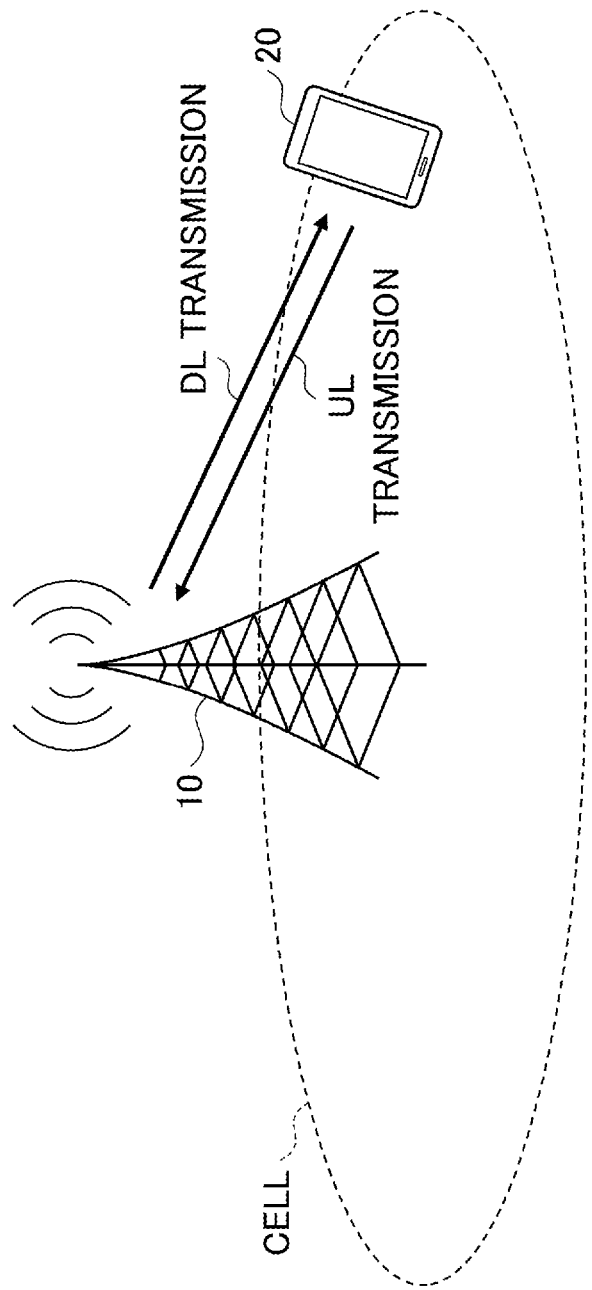
FIG. 1 is a diagram for describing a wireless communication system in an embodiment of the present invention.

FIG. 1 is a diagram for describing a wireless communication system in an embodiment of the present invention. The wireless communication system in the embodiment of the present invention includes a base station device 10 and a user equipment 20 as illustrated in FIG. 1. Although one base station device 10 and one user equipment 20 are illustrated in FIG. 1, this is an example, and a plurality of base station devices or a plurality of user equipments may be arranged.

The base station device 10 is a communication device that provides one or more cells and performs wireless communication with the user equipment 20. Physical resources of wireless signals may be defined by a time domain and a frequency domain, the time domain may be defined by the number of OFDM symbols, and the frequency domain may be defined by the number of subcarriers or the number of resource blocks. The base station device 10 transmits a synchronization signal and system information to the user equipment 20. The synchronization signal is, for example, NR-PSS and NR-SSS. For example, the system information is transmitted through an NR-PBCH and is also referred to as broadcast information. As illustrated in FIG. 1, the base station device 10 transmits a control signal or data to the user equipment 20 by downlink (DL) and receives a control signal or data from the user equipment 20 by uplink (UL). Both the base station device 10 and the user equipment 20 can transmit and receive signals by performing beam forming. Both the base station device 10 and the user equipment 20 can apply communication according to multiple input multiple output (MIMO) to DL or UL. Further, both the base station device 10 and the user equipment 20 may perform communication via a secondary cell (SCell) and a primary cell (PCell) by carrier aggregation (CA).

The user equipment 20 is a communication device with a wireless communication function such as a smartphone, a mobile phone, a tablet, a wearable terminal, or a M2M (machine-to-machine) communication module. As illustrated in FIG. 1, the user equipment 20 uses various kinds of communication services provided by the wireless communication system by receiving a control signal or data from the base station device 10 by DL and transmitting a control signal or data to the base station device 10 by UL.

As an extension function of MIMO in NR, multi-TRP or multi-panel transmission of transmitting a physical downlink shared channel (PDSCH) from a plurality of TRPs or panels is under review. Scheduling and configurations by a single physical downlink control channel (PDCCH) for multi-TRP or multi-panel transmission is under review. In the case of scheduling and configurations by a single PDCCH, the PDSCH transmitted from one or more TRPs or panels is scheduled through one PDCCH. Also, in downlink control information (DCI) included in the PDCCH, for example, in the case of transmission by two TRPs, an indication of the TCI states of TRP #1 and TRP #2 is given to the user equipment 20, and QCL assumption of the PDSCH is performed.

In order to configure the TCI state in the user equipment 20, an indication of a list of TCI states is given to the user equipment 20 for each cell and each bandwidth part (BWP) through "PDSCH-Config" which is RRC signaling. For example, 128 or more TCI states may be included in the list. Further, an indication of mapping between the TCI state included in the list and a DCI codepoint for indicating the TCI state is given to the user equipment 20 through media access control (MAC) signaling. For example, a maximum of the number of DCI codepoints for indicating the TCI state may be 8 or even greater. The MAC signaling is signaling by a MAC control element (CE).

Here, in the MAC signaling of the related art, only one of the TCI states included in the list can be mapped to the DCI codepoint for indicating the TCI state. Therefore, in the case of multi-TRP or multi-panel transmission, it is difficult to configure an individual TCI state for each PDSCH transmitted from a plurality of TRPs or panels.

Figure 2:
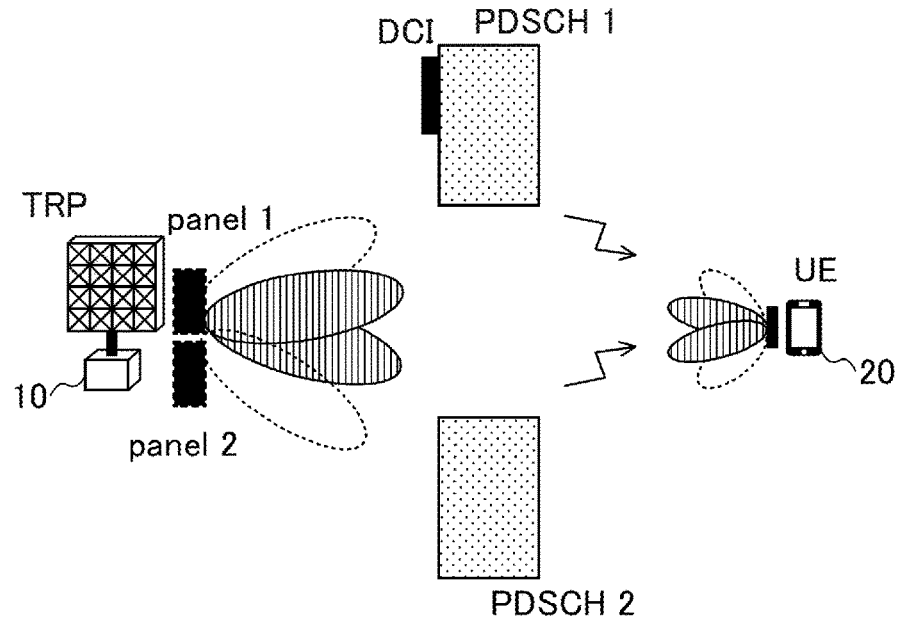
FIG. 2 is a diagram for describing transmission in which a plurality of panels are used in an embodiment of the present invention.

FIG. 2 is a diagram for describing transmission in which a plurality of panels are used in an embodiment of the present invention. As illustrated in FIG. 2, the base station device 10 performs transmission to the user equipment 20 using two panels (a panel 1 and a panel 2) in one TRP. A PDCCH including the DCI and a PDSCH 1 are transmitted from the panel 1, and a PDSCH 2 is transmitted from the panel 2. That is, in the case of scheduling and configurations by a single PDCCH, the user equipment 20 receives two PDSCHs on the basis of one DCI.

Figure 3:
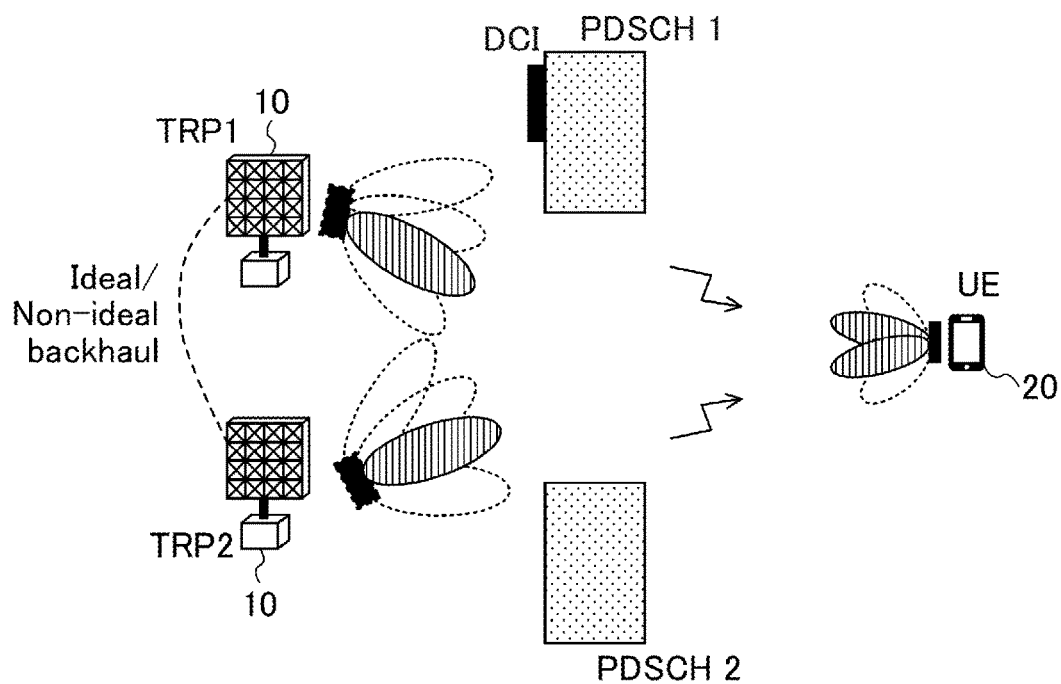
FIG. 3 is a diagram for describing transmission in which a plurality of TRPs are used in an embodiment of the present invention.

FIG. 3 is a diagram for describing transmission in which a plurality of TRPs are used in an embodiment of the present invention. As illustrated in FIG. 3, the base station device 10 performs transmission to the user equipment 20 using two TRPs (a TRP 1 and a TRP 2). A PDCCH including the DCI and a PDSCH 1 are transmitted from the TRP 1, and a PDSCH 2 is transmitted from the TRP 2. That is, in the case of scheduling and configurations by a single PDCCH, the user equipment 20 receives two PDSCHs on the basis of one DCI.

Figure 4:
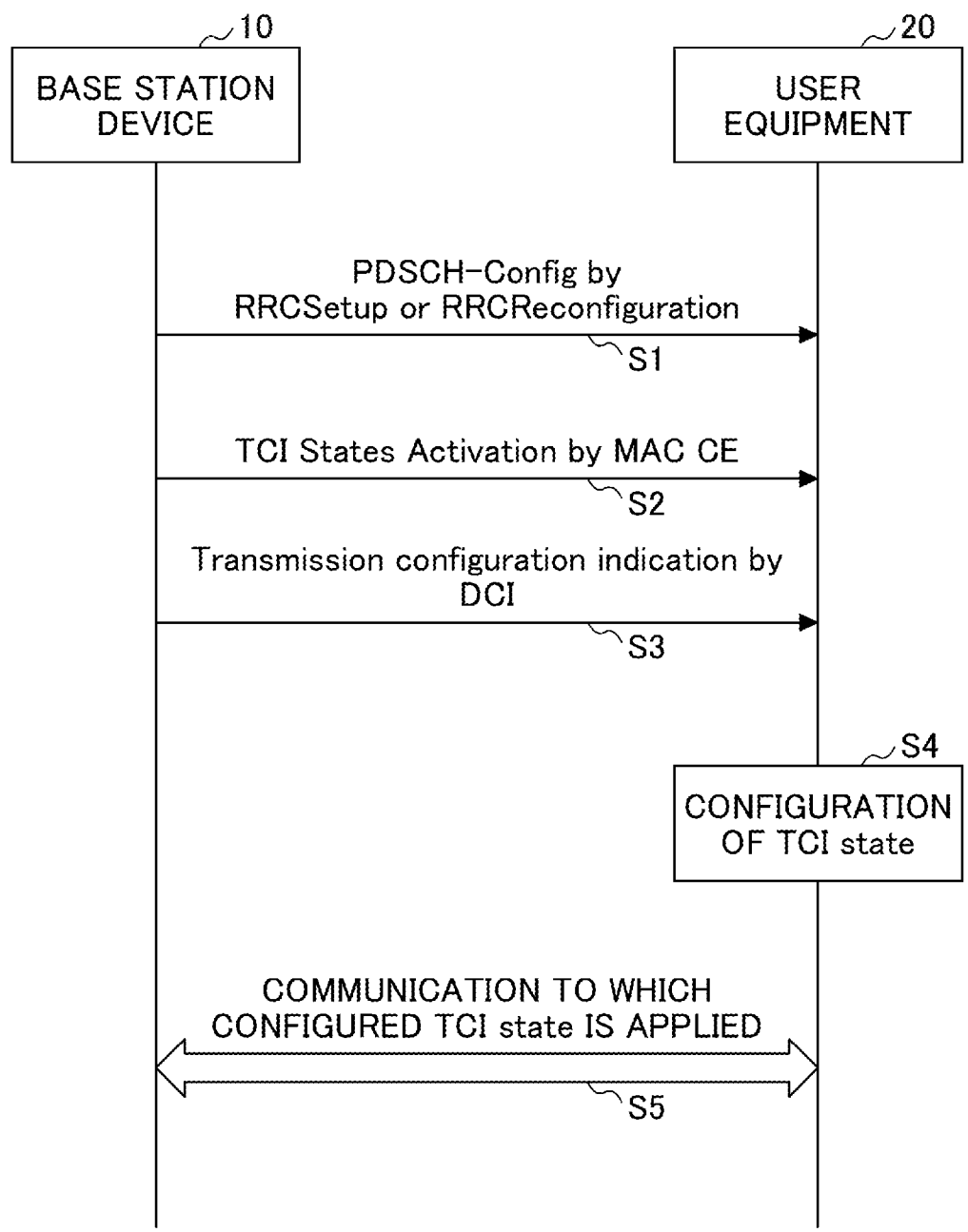
FIG. 4 is a sequence diagram for describing an operation example in an embodiment of the present invention.

FIG. 4 is a sequence diagram for describing an operation example in an embodiment of the present invention. An operation in which the TCI state is configured in the user equipment 20 will be described with reference to FIG. 4.

In step S1, the base station device 10 transmits "PDSCH-Config" based on "RRCSetup" or "RRCReconfiguration" which is RRC signaling to the user equipment 20. "PDSCH-Config" includes, for example, a list including a maximum of 128 TCI states. More TCI states may be included in the list. The TCI state includes information about the QCL related to the spatial reception parameter.

The QCL indicates that parameters can be regarded as being common between a reference signal including one or more synchronization signals or the like and a reference signal for data demodulation, and the following four types are specified (for example, Non-Patent Document) 3):

QCL-TypeA: Doppler shift, Doppler spread, average delay, and delay spread are the same;

QCL-TypeB: Doppler shift and Doppler spread are the same;

QCL-TypeC: Doppler shift and average delay are the same; and

QCL-TypeD: Spatial Rx parameter is the same.

In step S2, the base station device 10 transmits "TCI States Activation" via the MAC CE to the user equipment 20. A plurality of TCI states included in the list received in step S1 are mapped to TCI states applied to the PDSCH of the serving cell corresponding to each DCI codepoint by the "TCI States Activation". That is, a candidate TCI state to be used among the TCI states included in the list is activated.

The extended activation or deactivation is performed for the TCI state of the UE-specific PDSCH for multi-TRP or multi-panel transmission based on a single PDCCH, via the MAC CE. For example, each TCI state of the PDSCH may be deactivated as the initial state after handover. Upon receiving the MAC CE, a MAC entity indicates, to a lower layer, information related to activation or deactivation of the TCI state. "Multi-TRP or multi-panel" may be specified as a demodulation reference signal (DMRS) port group, may be specified as an antenna port group, may be specified as a group related to other reference signals, or may be specified as a TCI state group.

The MAC CE that performs the extended activation or deactivation on the TCI state of the UE-specific PDSCH for multi-TRP or multi-panel transmission based on a single PDCCH is identified by a logical channel ID (LCID) included in a MAC PDU sub header. For example, the MAC CE configures activation for a maximum of 8 TCI states from a plurality of TCI states configured by information elements "tci-StatesToAddModList" and "tci-StatesToReleaseList" included in the RRC signaling "PDSCH-Config". Further, for example, one or two activated TCI states are mapped to a value of a "Transmission Configuration Indication" field of the DCI, that is, the DCI codepoint by the MAC CE. The TCI states activated by the MAC CE are mapped to the DCI codepoint in an ascending order. The mapping will be described later in detail.

In step S3, the base station device 10 transmits the "Transmission configuration indication" by the DCI to the user equipment 20. The user equipment 20 receives the DCI codepoint by "Transmission configuration indication". The user equipment 20 specifies the TCI state corresponding to the DCI codepoint by mapping in step S2.

In step S4, the user equipment 20 configures a specified TCI state in the PDSCH. Then, the user equipment 20 and the base station device 10 execute communication to which the configured TCI state is applied.

Figure 5:
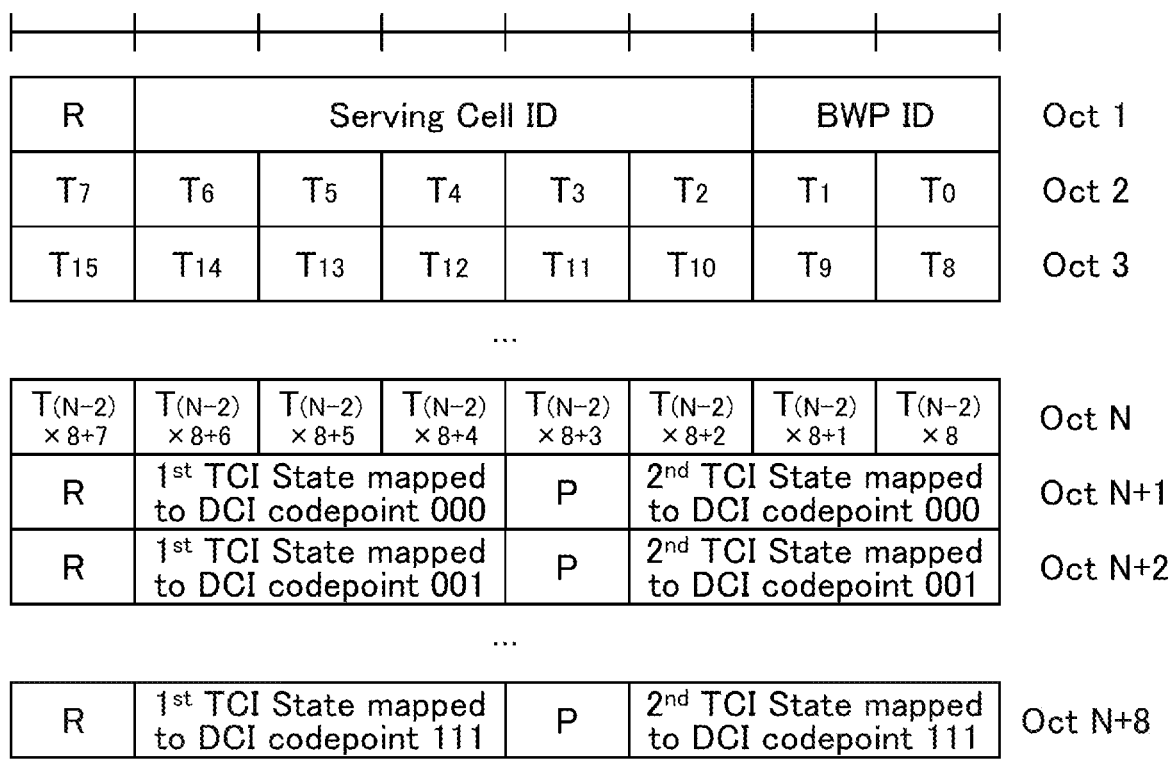
FIG. 5 illustrates a specification change example (1) related to an operation example in an embodiment of the present invention.

FIG. 5 illustrates a specification change example (1) related to an operation example in an embodiment of the present invention. The mapping by the MAC CE between the DCI codepoint and the TCI state included in the list in step S2 illustrated in FIG. 4 will be described with reference to FIG. 5.

"Serving Cell ID" illustrated in FIG. 5 is an identifier of the serving cell to which the MAC CE is applied. "BWP ID" illustrated in FIG. 5 is an identifier of the DL-BWP to which the MAC CE is applied.

According to "$T_i$" illustrated in FIG. 5, in a case in which there is a TCI state ID (TCI-StateId) (i) configured by the information elements "tci-StatesToAddModList" and "tci-StatesToReleaseList" included in the RRC signaling "PDSCH-Config", activation or deactivation of the TCI state corresponding to the TCI state ID(i) is indicated. The TCI state corresponding to the TCI state ID(i) is activated when $T_i$=1, and is mapped to the DCI codepoint, and is deactivated when $T_i$=0, and is not mapped to the DCI codepoint. $T_i$ is ignored in a case in which there is no TCI state ID(i) configured by the information elements "tci-StatesToAddModList" and "tci-StatesToReleaseList" included in the RRC signaling "PDSCH-Config."

The number of activated TCI states may be up to 8 or even greater. For example, the number of activated TCI states may be "2^(the number of bits of the DCI Transmission Configuration Indication field)×(the number of TCI states of the PDSCH indicated by the single DCI)."

"$1^{st}$ TCI State mapped to DCI codepoint xxx" illustrated in FIG. 5 indicates a TCI state mapped to a DCI codepoint xxx applied to a first TRP or panel. A value "000" corresponds to a first TCI state activated by $T_i$, and a value "001" corresponds to a second TCI state activated by $T_i$, that is, the values correspond to the activated TCI states in the ascending order.

"P" illustrated in FIG. 5 indicates that, in a case in which 1 is configured, there is a DCI codepoint xxx applied to the second TRP or panel. In a case in which 0 is configured in "P" illustrated in FIG. 5, "$2^{nd}$ TCI State mapped to DCI codepoint xxx" is ignored. In other words, transmission is performed with one TRP or panel.

"$2^{nd}$ TCI State mapped to DCI codepoint xxx" illustrated in FIG. 5 indicates the TCI state mapped to the DCI codepoint xxx applied to the second TRP or panel. A value "000" corresponds to a first TCI state activated by $T_i$, a value "001" corresponds to a second TCI state activated by $T_i$, that is, the values correspond to the activated TCI states in the ascending order.

"R" illustrated in FIG. 5 is a reserved bit, and "0" is configured.

"1st TCI State mapped to DCI codepoint 000" and "$2^{nd}$ TCI State mapped to DCI codepoint 000" illustrated in FIG. 5 corresponds to the value of the DCI Transmission Configuration Indication field being "000", and "1st TCI State mapped to DCI codepoint 001" and "$2^{nd}$ TCI State mapped to DCI codepoint 001" corresponds to the value of the DCI Transmission Configuration Indication field being "001". The number of DCI codepoints according to the DCI Transmission Configuration Indication field may be 8 at maximum (that is, the field has 3 bits), may be greater (for example, the field has 4 bits), or may be less (for example, the field has 2 bits)). Further, when there are more than two TRPs or panels, there may be "TCI State mapped to DCI codepoint xxx" indicating the TCI state mapped to the DCI codepoint xxx applied to third and fourth TRPs or panels, or "P" indicating their presences may exist in the MAC CE.

FIG. 6 illustrates a specification change example (2) related to an operation example in an embodiment of the present invention. The mapping by the MAC CE between the DCI codepoint and the TCI state included in the list in step S2 illustrated in FIG. 4 will be described with reference to FIG. 6.

"Serving Cell ID," "BWP ID," "$T_i$," and "R" illustrated in FIG. 6 are similar to those in FIG. 5.

"$AT_i$" illustrated in FIG. 6 maps the TCI state activated by "$T_i$" to the DCI Transmission Configuration Indication field. A value "000" of the DCI Transmission Configuration Indication field corresponds to an octet of "Oct N+1" illustrated in FIG. 6, and a value "001" corresponds to an octet of "Oct N+2" illustrated in FIG. 6, that is, one octet corresponds to each DCI codepoint.

"$AT_0$" illustrated in FIG. 6 corresponds to a first TCI state activated by $T_i$, and a value "$AT_1$" corresponds to a second TCI state activated by $T_i$, that is, $AT_i$ corresponds to the TCI state activated by $T_i$ in the ascending order. For example, the TCI states activated by a maximum of two $T_i$s may be mapped to each DCI codepoint, and further, in a case in which there are more than two TRPs or panels, the TCI states activated by a plurality of $T_i$s may be mapped to each DCI codepoint. Which of the mapped TCI states corresponds to the first TRP or panel or which of the mapped TCI states corresponds to the second TRP or panel may be specified in advance or may be configured separately.

FIG. 7 illustrates a specification change example (3) related to an operation example in an embodiment of the present invention. The mapping by the MAC CE between the DCI codepoint and the TCI state included in the list in step S2 illustrated in FIG. 4 will be described with reference to FIG. 7.

"Serving Cell ID", "BWP ID", "$T_i$", and "R" illustrated in FIG. 7 are similar to those in FIG. 5.

"DCI codepoint" illustrated in FIG. 7 indicates the value of the DCI Transmission Configuration Indication field to which the activated TCI state is mapped, that is, the codepoint.

"P" illustrated in FIG. 7 indicates that, in a case in which 1 is configured, there is a second $T_i$ field applied to the second TRP or panel. In a case in which 0 is configured in "P" illustrated in FIG. 7, the second $T_i$ field is not configured. In other words, transmission is performed with one TRP or panel.

According to "$T_i$" illustrated in FIG. 7, in a case in which there is a TCI state ID (TCI-StateId) (i) configured by the information elements "tci-StatesToAddModList" and "tci-StatesToReleaseList" included in the RRC signaling "PDSCH-Config", activation or deactivation of the TCI state corresponding to a TCI state ID(i) is indicated. The TCI state corresponding to the TCI state ID(i) is activated when $T_i=1$, and is mapped to the DCI codepoint, and is deactivated when $T_i=0$, and is not mapped to the DCI codepoint. $T_i$ is ignored in a case in which there is no TCI state ID(i) configured by the information elements "tci-StatesToAddModList" and "tci-StatesToReleaseList" included in the RRC signaling "PDSCH-Config".

For each "DCI codepoint", the TCI state applied to the first TRP or panel is indicated from a first $T_i$ field set, and the TCI state applied to the second TRP or panel is indicated from a second $T_i$ field set. That is, the TCI state activated by a bitmap is specified in the $T_i$ field set. For example, the $T_i$ field set may include 128 or more TCI states. Further, for example, the number of "DCI codepoints" may be 8 indicated by 3 bits or may be a large number indicated by more bits. Further, in a case in which there are more than two TRPs or panels, the number of $T_i$ field sets corresponding to the TRP or panel may be increased for each "DCI codepoint".

FIG. 8 illustrates a specification change example (4) related to an operation example in an embodiment of the present invention. The mapping by the MAC CE between the DCI codepoint and the TCI state included in the list in step S2 illustrated in FIG. 4 will be described with reference to FIG. 8.

"Serving Cell ID", "BWP ID", "$T_i$", and "R" illustrated in FIG. 8 are similar to those in FIG. 7.

For each "DCI codepoint", the TCI state applied to the first TRP or panel, or the TCI state applied to the first TRP or panel and the TCI state applied to the second TRP or panel is indicated from the $T_i$ field set. That is, the TCI state activated by a bitmap is specified in the $T_i$ field set. For example, the $T_i$ field set may include 128 or more TCI states, similarly to FIG. 7. Further, for example, the number of "DCI codepoints" may be 8 indicated by 3 bits or may be a large number indicated by more bits. In a case in which a plurality of TRPs or panels are used, the TCI states corresponding to the number of TRPs or panels may be activated for each DCI codepoint. Which TCI state among the activated TCI states corresponds to which TRP or panel may be specified in advance or may be configured separately.

FIG. 9 illustrates a specification change example (5) related to an operation example in an embodiment of the present invention. The mapping by the MAC CE between DCI codepoint and TCI state included in the list in step S2 illustrated in FIG. 4 will be described with reference to FIG. 9.

"Serving Cell ID", "BWP ID", "$T_i$", and "R" illustrated in FIG. 9 are similar to those in FIG. 8.

FIG. 9 illustrates a figure in which octets including "DCI codepoint" illustrated in FIG. 8 are deleted from FIG. 8. A first $T_i$ field set corresponds to a DCI codepoint 000, and a second $T_i$ field set corresponds to the DCI codepoint 001, that is, the $T_i$ field sets correspond to the DCI codepoints in the ascending order. For example, the $T_i$ field set may include 128 or more TCI states, similarly to FIG. 7. Further, for example, the number of "DCI codepoints" may be 8 indicated by 3 bits or may be a large number indicated by more bits. In a case in which a plurality of TRPs or panels are used, the TCI states corresponding to the number of TRPs or panels may be activated for each DCI codepoint. Which TCI state among the activated TCI states corresponds to which TRP or panel may be specified in advance or may be configured separately.

According to the above embodiment, the user equipment 20 can individually designate the TCI state for each of the PDSCHs transmitted from a plurality of TRPs or panels of the base station device 10 and execute communication to which appropriate QCL assumption is applied.

In other words, it is possible to configure communication in which a plurality of TRPs or panels are used in the wireless communication system.

(Device Configuration)

Next, function configuration examples of a base station device 10 and a user equipment 20 that execute the processes and the operations described above will be described. The base station device 10 and the user equipment 20 have functions for implementing the embodiments described above. However, each of the base station device 10 and the user equipment 20 may have only some of the functions in the embodiment.

<Base Station Device 10>

Figure 10:
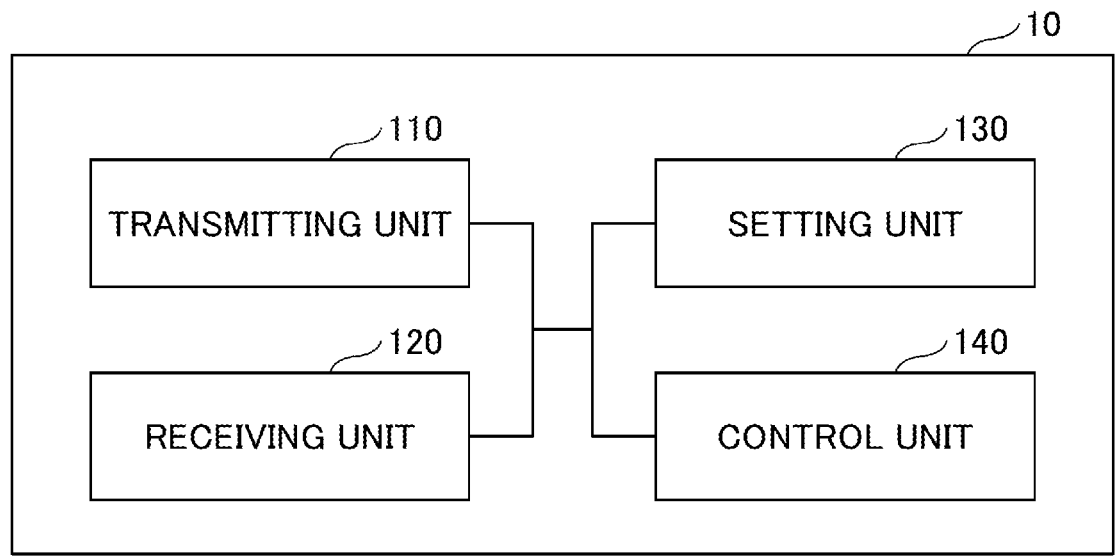
FIG. 10 is a diagram illustrating an example of a functional configuration of a base station device 10 in an embodiment of the present invention.

FIG. 10 is a diagram illustrating an example of a functional configuration of the base station device 10 in an embodiment of the present invention. As illustrated in FIG. 10, the base station device 10 includes a transmitting unit 110, a receiving unit 120, a setting unit 130, and a control unit 140. The functional configuration illustrated in FIG. 10 is only an example. A functional classification and names of the functional unit may be any classification and any names as long as the operation according to an embodiment of the present invention can be executed.

The transmitting unit 110 includes a function of generating a signal to be transmitted to the user equipment 20 side and transmitting the signal wirelessly. The receiving unit 120 includes a function of receiving various kinds of signals transmitted from the user equipment 20 and acquiring, for example, higher layer information from received signals. Further, the transmitting unit 110 has a function of transmitting NR-PSS, NR-SSS, NR-PBCH, DL/UL control signals, or the like to the user equipment 20.

The setting unit 130 stores configuration information configured in advance and various kinds of configuration information to be transmitted to the user equipment 20 in a storage device, and reads out them from the storage device if necessary. For example, content of the configuration information is a communication configuration or the like related to the TRP or panel of the user equipment 20.

As described in the embodiment, the control unit 140 performs a process related to the communication configuration related to the TRP or panel of the user equipment 20. As described in the embodiment, the control unit 140 controls communication in which a plurality of TRPs or panels are used. The functional unit related to signal transmission in the control unit 140 may be included in the transmitting unit 110, and the functional unit related to signal reception in the control unit 140 may be included in the receiving unit 120.

<User Equipment 20>

Figure 11:
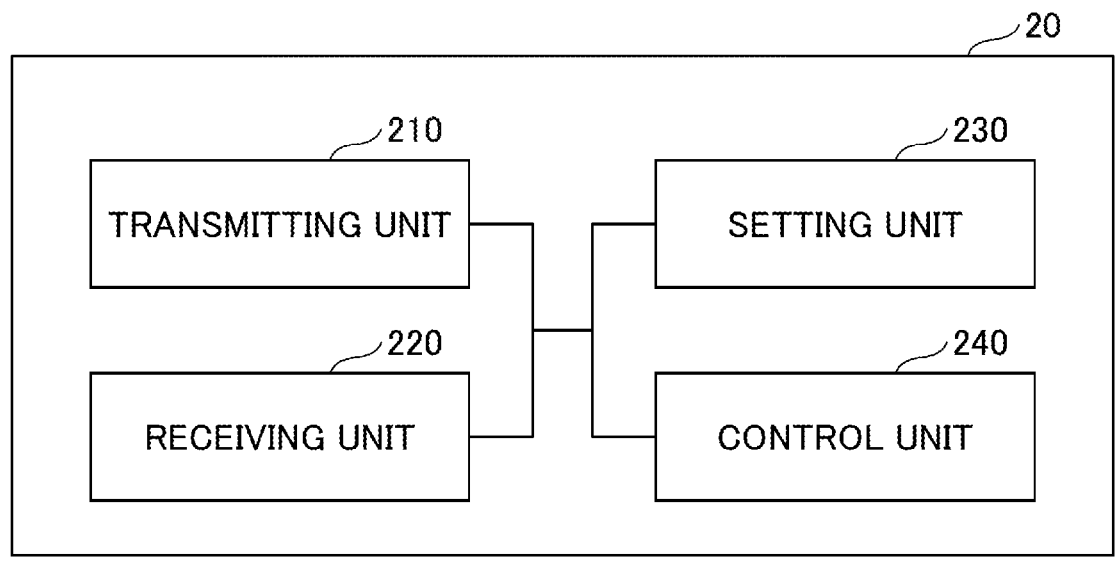
FIG. 11 is a diagram illustrating an example of a functional configuration of a user equipment 20 in an embodiment of the present invention.

FIG. 11 illustrates an example of a functional configuration of the user equipment 20. As illustrated in FIG. 11, the user equipment 20 includes a transmitting unit 210, a receiving unit 220, a setting unit 230, and a control unit 240. The functional configuration illustrated in FIG. 11 is only an example. A functional classification and names of the functional unit may be any classification and any names as long as the operation according to an embodiment of the present invention can be executed.

The transmitting unit 210 generates a transmission signal from transmission data and transmits the transmission signal wirelessly. The receiving unit 220 wirelessly receives various kinds of signals and acquires higher layer signals from received physical layer signals. The receiving unit 220 includes a function of receiving NR-PSS, NR-SSS, NR-PBCH, and DL/UL/SL control signals or the like transmitted from the base station device 10. Further, for example, the transmitting unit 210 transmits a physical sidelink control channel (PSCCH), a physical sidelink shared channel (PSSCH), a physical sidelink discovery channel (PSDCH), a physical sidelink broadcast channel (PSBCH), and the like to other user equipment 20 as D2D communication, and the receiving unit 120 receives PSCCH, PSSCH, PSDCH, PSBCH, and the like from other user equipment 20.

The setting unit 230 stores various kinds of configuration information received from the base station device 10 or the user equipment 20 by the receiving unit 220 in a storage device, and reads out them from the storage device if necessary. The setting unit 230 also stores configuration information configured in advance. For example, content of the configuration information is a communication configuration or the like related to the TRP or panel of the user equipment 20.

As described in the embodiment, the control unit 240 controls communication in which a plurality of TRPs or panels are used on the basis of the communication configuration acquired from the base station device 10. The functional unit related to signal transmission in the control unit 240 may be included in the transmitting unit 210, and the functional unit related to signal reception in the control unit 240 may be included in the receiving unit 220.

(Hardware Configuration)

In the block diagrams (FIGS. 10 and 11) used for the description of the embodiment, the blocks of the functional units are illustrated. The functional blocks (configuring units) are implemented by an arbitrary combination of hardware and/or software. A device of implementing each functional block is not particularly limited. In other words, each functional block may be implemented by one device which is physically or logically combined or may be implemented by a plurality of devices, that is, two or more devices which are physically and/or logically separated and are directly or indirectly connected (for example, a wired and/or wireless manner). The function block may be implemented by combining software with the one device or the plurality of devices.

The functions include determining, deciding, judging, computing, calculating, processing, deriving, investigating, searching, confirming, receiving, transmitting, outputting, accessing, resolving, selecting, choosing, establishing, comparing, assuming, expectation, regarding, broadcasting, notifying, communicating, forwarding, configuring, reconfiguring, allocating, mapping, assigning, and the like but are not limited thereto. For example, a functional block (configuring unit) that causes transmission to function is referred to as a transmitting unit or a transmitter. In any case, as described above, an implementation method is not particularly limited.

Figure 12:
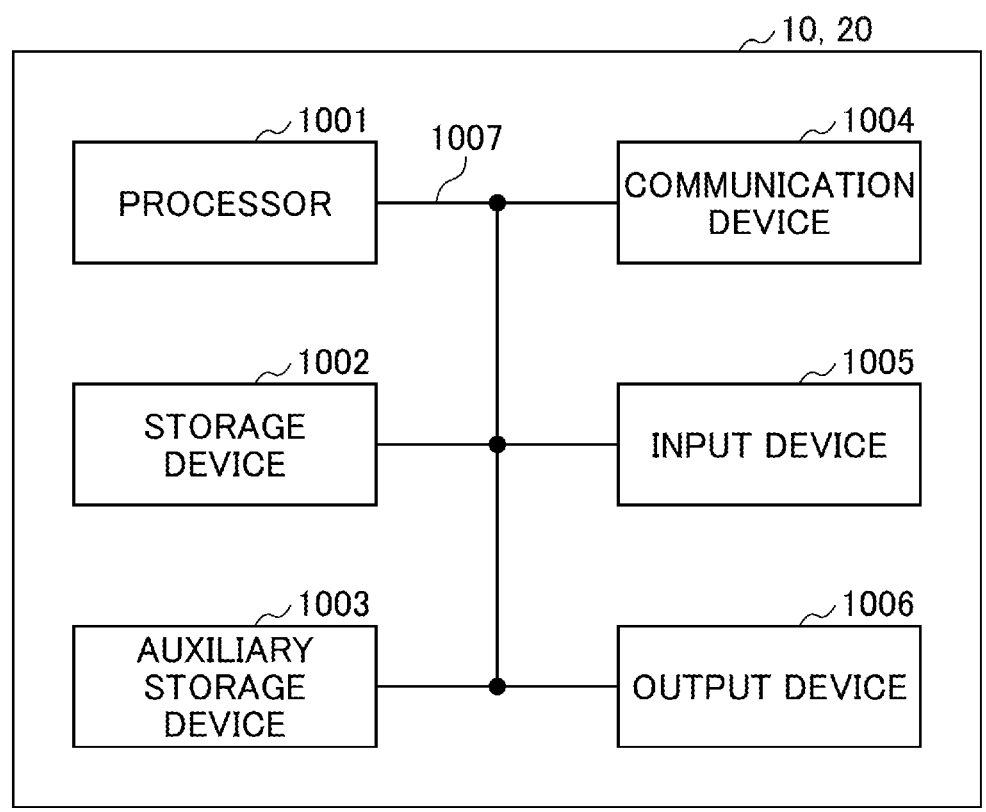
FIG. 12 is a diagram illustrating an example of a hardware configuration of a base station device 10 or a user equipment 20 in an embodiment of the present invention.

For example, the base station device 10, the user equipment 20, or the like in one embodiment of the present disclosure may function as a computer for processing the present disclosure's wireless communication method. FIG. 12 is a diagram illustrating an example of a hardware configuration of the base station device 10 and the user equipment 20 according to an embodiment of the present disclosure. Each of the base station device 10 and the user equipment 20 may be physically configured as a computer device including a processor 1001, a storage device 1002, an auxiliary storage device 1003, a communication device 1004, an input device 1005, an output device 1006, a bus 1007, and the like.

In the following description, the term "device" can be read as a circuit, device, unit, or the like. The hardware configuration of each of the base station device 10 and the user equipment 20 may be configured to include one or more devices illustrated in the drawing or may be configured without including some devices.

Each function in each of the base station device 10 and the user equipment 20 is implemented such that predetermined software (program) is read on hardware such as the processor 1001 and the storage device 1002, and the processor 1001 performs an operation and controls communication by the communication device 1004 and reading and/or writing of data in the storage device 1002 and the auxiliary storage device 1003.

For example, the processor 1001 operates an operating system and controls the entire computer. The processor 1001 may be configured with a central processing unit (CPU) including an interface with a peripheral device, a control device, an operation device, a register, and the like. For example, the control unit 140, the control unit 240, and the like described above may be implemented by the processor 1001.

Further, the processor 1001 reads a program (program code), a software module, or data from at least one of the auxiliary storage device 1003 and/or the communication device 1004 out to the storage device 1002, and executes various types of processes according to them. A program causing a computer to execute at least some of the operations described in the above embodiment is used as the program. For example, the control unit 140 of the base station device 10 illustrated in FIG. 10 may be implemented by a control program which is stored in the storage device 1002 and operates on the processor 1001. Further, for example, the control unit 240 of the user equipment 20 illustrated in FIG. 11 may be implemented by a control program which is stored in the storage device 1002 and operates on the processor 1001. Various types of processes have been described as being performed by one processor 1001 but may be performed simultaneously or sequentially by two or more processors 1001. The processor 1001 may be implemented by one or more chips. The program may be transmitted from a network via an electric communication line.

The storage device 1002 is a computer readable recording medium and configured with at least one of a read only memory (ROM), an erasable programmable ROM (EPROM), an electrically erasable programmable ROM (EEPROM), a random access memory (RAM), and the like. The storage device 1002 is also referred to as a "register," a "cache," a "main memory," or the like. The storage device 1002 can store programs (program codes), software modules, or the like which are executable for carrying out the communication method according to an embodiment of the present disclosure.

The auxiliary storage device 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The storage medium may be, for example, a database, a server, or any other appropriate medium including at least one of the storage device 1002 and the auxiliary storage device 1003.

The communication device 1004 is hardware (a transceiving device) for performing communication between computers via at least one of a wired network and a wireless network and is also referred to as a "network device," a "network controller," a "network card," a "communication module," or the like. The communication device 1004 may include a high-frequency switch, a duplexer, a filter, a frequency synthesizer, or the like in order to implement at least one of frequency division duplex (FDD) and time division duplex (TDD). For example, a transceiving antenna, an amplifying unit, a transmitting/receiving unit, a transmission line interface, or the like may be implemented by the communication device 1004. The transmitting/receiving unit may be implemented by to be physically or logically separated by a transmitting unit and a receiving unit.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs output to the outside. The input device 1005 and the output device 1006 may be integrated (for example, a touch panel).

The respective devices such as the processor 1001 and the storage device 1002 are connected via the bus 1007 to communicate information with each other. The bus 1007 may be configured with a single bus or may be configured with different buses between the devices.

Further, each of the base station device 10 and the user equipment 20 may be configured to include hardware such as a microprocessor, a digital signal processor (DSP), an application specific integrated circuit (ASIC), a programmable logic device (PLD), or a field programmable gate array (FPGA) or all or some of the functional blocks may be implemented by hardware. For example, the processor 1001 may be implemented using at least one of these pieces of hardware.

(Conclusion of Embodiment)

As described above, according to an embodiment of the present invention, a user equipment including a control unit that individually applies a configuration related to quasi co-location (QCL) to each of downlink shared channels transmitted from a plurality of transmission reception points (TRPs) or panels on the basis of information related to the transmission configuration state and a communication unit that performs communication via the downlink shared channel to which the configurations related to the plurality of QCLs are individually applied is provided.

With the above configuration, the user equipment 20 can individually designate the TCI state for each of the PDSCHs transmitted from a plurality of TRPs or panels of the base station device 10 and execute communication to which appropriate QCL assumption is applied. In other words, it is possible to configure communication in which a plurality of TRPs or panels are used in the wireless communication system.

The information related to the transmission configuration state may include radio resource control (RRC) signaling, media access control (MAC) signaling, and downlink control information (DCI), the RRC signaling may include a first number of transmission configuration states, the MAC signaling may activate a second number of transmission configuration states among the first number of transmission configuration states, and the DCI may have a field that designates the transmission configuration state of each of the downlink shared channels transmitted from the plurality of TRPs or panels from the second number of activated transmission configuration states. With this configuration, the user equipment 20 can individually designate the TCI state for each of the PDSCHs transmitted from multiple TRPs or panels of the base station device 10.

The MAC signaling may indicate which of the second number of activated transmission configurations is applied to each of the downlink shared channels transmitted from the plurality of TRPs or panels for each codepoint of a field of the DCI. With this configuration, the user equipment 20 can individually designate the TCI state for each of the PDSCHs transmitted from multiple TRPs or panels of the base station device 10.

The MAC signaling may indicate which of the first number of transmission configurations is applied to each of the downlink shared channels transmitted from the plurality of TRPs or panels for each codepoint of a field of the DCI. With this configuration, the user equipment 20 can individually designate the TCI state for each of the PDSCHs transmitted from multiple TRPs or panels of the base station device 10.

The MAC signaling may not explicitly include information indicating the codepoint of the field of the DCI. With this configuration, the user equipment 20 can individually designate the TCI state for each of the PDSCHs transmitted from multiple TRPs or panels of the base station device 10 with a smaller payload.

Further, a base station device including a transmitting unit that transmits information related to a transmission configuration state of a downlink shared channel to a user equipment, a control unit that individually applies a configuration related to quasi co-location (QCL) to each of the downlink shared channels transmitted from a plurality of transmission reception points (TRPs) or panels on the basis of the information related to the transmission configuration state, and a communication unit that performs communication via the downlink shared channel to which the configurations related to the plurality of QCLs are individually applied is provided.

With the above configuration, the user equipment 20 can individually designate the TCI state for each of the PDSCHs transmitted from a plurality of TRPs or panels of the base station device 10 and execute communication to which appropriate QCL assumption is applied. In other words, it is possible to configure communication in which a plurality of TRPs or panels are used in the wireless communication system.

(Supplement of Embodiment)

The exemplary embodiment of the present invention has been described above, but the disclosed invention is not limited to the above embodiments, and those skilled in the art would understand various modified examples, revised examples, alternative examples, substitution examples, and the like. In order to facilitate understanding of the invention, specific numerical value examples have been used for description, but the numerical values are merely examples, and certain suitable values may be used unless otherwise stated. The classification of items in the above description is not essential to the present invention, matters described in two or more items may be combined and used if necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no inconsistency. For the sake of convenience of processing description, the base station device 10 and the user equipment 20 have been described using the functional block diagrams, but such devices may be implemented by hardware, software, or a combination thereof. Software executed by the processor included in the base station device 10 according to the embodiment of the present invention and software executed by the processor included in the user equipment 20 according to the embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Further, an indication of information is not limited to the aspect or embodiment described in the present disclosure and may be given by any other method. For example, the indication of information may be given by physical layer signaling (for example, downlink control information (DCI) or uplink control information (UCI)), upper layer signaling (for example, radio resource control (RRC) signaling, medium access control (MAC) signaling, broadcast information (master information block (MIB), system information block (SIB))), other signals, or a combination thereof. Further, the RRC signaling may be referred to as an RRC message and may be, for example, an RRC connection setup message, an RRC connection reconfiguration message, or the like.

Each aspect and embodiment of the present invention may be applied to at least one of Long Term Evolution (LTE), LTE-advanced (LTE-A), SUPER 3G, IMT-advanced, 4th generation mobile communication system (4G), 5th generation mobile communication system (5G), Future Radio Access (FRA), New Radio (NR), W-CDMA (registered trademark), GSM (registered trademark), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), a system using any other appropriate system, and next generation systems extended on the basis of these standards. Further, a plurality of systems may be combined and applied (for example, a combination of at least one of LTE and LTE-A and 5G or the like).

The processing procedures, the sequences, the flowcharts, and the like of the respective aspects/embodiments described in this specification may be reversed in order unless there is a contradiction. For example, the method described in the present disclosure presents elements of various steps using an exemplary order and is not limited to a presented specific order.

In this specification, a specific action that is supposed to be performed by the base station device 10 may be performed by an upper node in some cases. In the network including one or more network nodes including the base station device 10, various operations performed for communication with the user equipment 20 can be obviously performed by at least one of the base station and any network node (for example, an MME, an S-GW, or the like is considered, but it is not limited thereto) other than the base station device 10 and/or the base station device 10. The example in which the number of network nodes excluding the base station device 10 is one has been described above, but other network nodes in which a plurality of other network nodes (for example, an MME and an S-GW) are combined may be provided.

Information, a signal, or the like described in the present disclosure may be output from an upper layer (or a lower layer) to a lower layer (or an upper layer). Information, a signal, or the like described in the present disclosure may be input and output via a plurality of network nodes.

Input and output information and the like may be stored in a specific place (for example, a memory) or may be managed through a management table. Input and output information and the like may be overwritten, updated, or additionally written. Output information and the like may be deleted. Input information and the like may be transmitted to another device.

The determination of the present disclosure may be performed in accordance with a value (0 or 1) indicated by one bit, may be performed in accordance with a Boolean value (true or false), or may be performed by a comparison of numerical values (for example, a comparison with a predetermined value).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, and the like regardless of whether software is called software, firmware, middleware, a microcode, a hardware description language, or any other name.

Further, software, commands, information, and the like may be transmitted and received via a transmission medium. For example, when software is transmitted from a website, a server, or any other remote source using at least one of a wired technology (such as a coaxial cable, a fiber optic cable, a twisted pair, or a digital subscriber line (DSL)) and a radio technology (such as infrared rays or a microwave), at least one of the wired technology and the radio technology are included in a definition of a transmission medium.

Information, signals, and the like described in this specification may be indicated using any one of a variety of different techniques. For example, data, instructions, commands, information, signals, bits, symbols, chips, and the like which are mentioned throughout the above description may be indicated by voltages, currents, electromagnetic waves, magnetic particles, optical fields or photons, or an arbitrary combination thereof.

The terms described in the present disclosure and terms necessary for understanding the present disclosure may be replaced with terms having the same or similar meanings. For example, at least one of a channel and a symbol may be a signal. Further, a signal may be a message. Further, a component carrier (CC) may be referred to as a "carrier frequency," a "cell," or the like.

The terms "system" and "network" used in the present disclosure are used interchangeably.

Further, information, parameters, and the like described in the present disclosure may be indicated by absolute values, may be indicated by relative values from predetermined values, or may be indicated by corresponding other information. For example, radio resources may be those indicated by an index.

The names used for the above-described parameters are not limited in any respect. Further, mathematical formulas or the like using the parameters may be different from those explicitly disclosed in the present disclosure. Since various channels (for example, a PUCCH, a PDCCH, and the like) and information elements can be identified by suitable names, various names allocated to the various channels and the information elements are not limited in any respect.

In the present disclosure, the terms "base station (BS)," "radio base station," "base station device," "fixed station," "Node B," "eNode B (eNB) gNodeB (gNB)," "access point," "transmission point," "reception point," "transmission/reception point," "cell," "sector," "cell group," "carrier," "component carrier," and the like can be used interchangeably. The base stations may also be indicated by terms such as a macro cell, a small cell, a femtocell, and a picocell.

The base station eNB can accommodate one or more (for example, three) cells. In a case in which the base station accommodates a plurality of cells, the entire coverage area of the base station can be partitioned into a plurality of small areas, and each small area can provide a communication service through a base station subsystem (for example, a small indoor base station (a remote radio head (RRH)). The term "cell" or "sector" refers to the whole or a part of the coverage area of at least one of the base station and the base station subsystem that performs a communication service in the coverage.

In the present disclosure, the terms "mobile station (MS)," "user terminal," "user equipment (UE)," "terminal," and the like can be used interchangeably.

The mobile station may be a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, handset, user agent, mobile client, client, or may be referred to by some other suitable term.

At least one of the base station and the mobile station may be also referred to as a transmitting device, a receiving device, a communication device, or the like. At least one of the base station and the mobile station may be a device installed in a mobile body, a mobile body itself, or the like. The moving body may be a vehicle (for example, a car, an airplane, or the like), a moving body that moves unmanned (for example, a drone, an autonomous car or the like), or a robot (manned type or unmanned type). At least one of the base station and the mobile station includes a device which need not necessarily move during a communication operation. For example, at least one of the base station and the mobile station may be an Internet of things (IoT) device such as a sensor.

Further, the base station in the present disclosure may be replaced with a user terminal. For example, each aspect/embodiment of the present disclosure may be applied to a configuration in which communication between the base station and the user terminal is replaced with communication between a plurality of user equipment 20 (for example, which may be referred to as device-to-device (D2D) or vehicle-to-everything (V2X)). In this case, the user equipment 20 may have the functions of the base station device 10 described above. Further, the terms "uplink" and "downlink" may be replaced with terms (for example, "side") corresponding to inter-terminal communication. For example, an uplink channel, a downlink channel, or the like may be read as side channels.

Similarly, the user terminal in the present disclosure may be replaced with the base station. In this case, the base station may have the functions of the above-mentioned user terminal.

The terms "determining" and "deciding" used in this specification may include a wide variety of actions. For example, "determining" and "deciding" may include, for example, events in which events such as judging, calculating, computing, processing, deriving, investigating, looking up, search, and inquiry (for example, looking up in a table, a database, or another data structure), or ascertaining are regarded as "determining" or "deciding." Further, "determining" and "deciding" may include, for example, events in which events such as receiving (for example, receiving information), transmitting (for example, transmitting information), input, output, or accessing (for example, accessing data in a memory) are regarded as "determining" or "deciding." Further, "determining" and "deciding" may include, for example, events in which events such as resolving, selecting, choosing, establishing, or comparing are regarded as "determining" or "deciding." In other words, "determining" and "deciding" may include events in which a certain operation is regarded as "determining" or "deciding." Further, "determining (deciding)" may be replaced with "assuming," "expecting," "considering," or the like.

Terms "connected," "coupled," or variations thereof means any direct or indirect connection or coupling between two or more elements and may include the presence of one or more intermediate elements between two elements which are "connected" or "coupled." The coupling or the connection between the elements may be physical, logical, or a combination thereof. For example, "connection" may be replaced with "access." In a case in which used in the present disclosure, two elements may be considered to be "connected" or "coupled" with each other using at least one of one or more electric wires, cables and/or a printed electrical connection or using electromagnetic energy having a wavelength in a radio frequency domain, a microwave region, or a light (both visible and invisible) region as non-limiting and non-exhaustive examples.

A reference signal may be abbreviated as RS and may be referred to as a pilot, depending on a standard to be applied.

A phrase "on the basis of" used in the present disclosure is not limited to "on the basis of only" unless otherwise stated. In other words, a phrase "on the basis of" means both "on the basis of only" and "on the basis of at least."

Any reference to an element using a designation such as "first," "second," or the like used in the present disclosure does not generally restrict quantities or an order of those elements. Such designations can be used in the present disclosure as a convenient method of distinguishing two or more elements. Thus, reference to the first and second elements does not mean that only two elements can be adopted there, or the first element must precede the second element in a certain form.

Further, "means" in the configuration of each of the above devices may be replaced with "unit," "circuit," "device," or the like.

In a case in which "include," "including," and variations thereof are used in the present disclosure, these terms are intended to be comprehensive, similarly to a term "comprising." Further, the term "or" used in the present disclosure is intended not to be an exclusive disjunction.

A radio frame may include one or more frames in the time domain. In the time domain, each of one or more frames may be referred to as a subframe. The subframe may further include one or more slots in the time domain. The subframe may have a fixed time length (for example, 1 ms) not depending on numerology.

The numerology may be a communication parameter applied to at least one of transmission and reception of a certain signal or channel. For example, the numerology may indicate at least one of a subcarrier spacing (SCS), a bandwidth, a symbol length, a cyclic prefix length, a transmission time interval (TTI), a number of symbols per TTI, a radio frame configuration, a specific filtering process performed in the frequency domain by a transceiver, a specific windowing process performed in the time domain by a transceiver, and the like.

The slot may include one or more symbols (orthogonal frequency division multiplexing (OFDM) symbols, single carrier frequency division multiple access (SC-FDMA) symbols, or the like) in the time domain. The slot may be a time unit based on the numerology.

The slot may include a plurality of mini slots. Each mini slot may include one or more symbols in the time domain. Further, the mini slot may be referred to as a sub-slot. The mini slot may include fewer symbols than a slot. A PDSCH (or PUSCH) transmitted in units of times greater than the mini slot may be referred to as a PDSCH (or PUSCH) mapping type A. A PDSCH (or PUSCH) transmitted using a mini slot may be referred to as a PDSCH (or PUSCH) mapping type B.

All of a radio frame, a subframe, a slot, a mini slot, and a symbol indicates a time unit for transmitting a signal. As a radio frame, a subframe, a slot, a mini slot, and a symbol, different designations respectively corresponding to them may be used.

For example, one subframe may be referred to as a transmission time interval (TTI: Transmission Time Interval), or a plurality of consecutive subframes may be referred to as TTIs, or one slot or one mini slot may be referred to as a TTI. In other words, at least one of the subframe and the TTI may be a subframe (1 ms) in the existing LTE, may be a period shorter than 1 ms (for example, 1 to 13 symbols), or may be referred to as a period longer than 1 ms. A unit representing the TTI may be referred to as slot, a mini slot, or the like instead of the subframe.

Here, for example, the TTI refers to a minimum time unit of scheduling in wireless communication. For example, in the LTE system, the base station performs scheduling of allocating a radio resource (a frequency bandwidth, a transmission power, or the like which can be used in each user equipment 20) to each user equipment 20 in units of TTIs. The definition of the TTI is not limited thereto.

The TTI may be a transmission time unit such as a channel coded data packet (transport block), a code block, or a code word, or may be a processing unit such as scheduling or link adaptation. Further, when a TTI is given, a time interval (for example, the number of symbols) in which a transport block, a code block, a code word, or the like is actually mapped may be shorter than the TTI.

Further, when one slot or one mini slot is referred to as a TTI, one or more TTIs (that is, one or more slots or one or more mini slots) may be a minimum time unit of scheduling. Further, the number of slots (the number of mini slots) constituting the minimum time unit of scheduling may be controlled.

A TTI having a time length of 1 ms may be referred to as a common TTI (TTI in LTE Rel. 8 to 12), a normal TTI, a long TTI, a common subframe, a normal subframe, a long subframe, a slot, or the like. A TTI shorter than the common TTI may be referred to as a reduced TTI, a short TTI, a partial TTI (a partial or fractional TTI), a reduced subframe, a short subframe, a mini slot, a sub slot, a slot, or the like.

Further, a long TTI (for example, a common TTI, a subframe, or the like) may be replaced with a TTI having a time length exceeding 1 ms, and a short TTI (for example, a reduced TTI or the like) may be replaced with a TTI having a TTI length which is less than a TTI length of a long TTI and equal to or more than 1 ms.

The resource block (RB) is a resource allocation unit in the time domain and the frequency domain and may include one or more consecutive subcarriers in the frequency domain. The number of subcarriers included in an RB may be the same irrespective of a numerology and may be, for example, 12. The number of subcarriers included in an RB may be decided on the basis of a numerology.

Further, a time domain of an RB may include one or more symbols and may be a length of one slot, one mini slot, one subframe, or one TTI. Each of one TTI, one subframe, or the like may be constituted by one or more resource blocks.

Further, one or more RBs may be referred to as a physical resource block (PRB), a subcarrier group (SCG), a resource element group (REG), a PRB pair, an RB pair, or the like.

Further, the resource block may be constituted by one or more resource elements (RE). For example, one RE may be a radio resource region of one subcarrier and one symbol.

A bandwidth part (BWP) (which may be referred to as a partial bandwidth) may indicate a subset of consecutive common resource blocks (RBs) for a certain numerology in a certain carrier. Here, a common RB may be specified by an index of an RB based on a common reference point of a carrier. A PRB may be defined in a BWP and numbered in a BWP.

The BWP may include a BWP for UL (UL BWP) and a BWP for DL (DL BWP). In a UE, one or more BWPs may be configured within one carrier.

At least one of configured BWPs may be active, and it may not be assumed that the UE transmits and receives a predetermined signal/channel outside an active BWP. Further, a "cell," a "carrier," or the like in the present disclosure may be replaced with a "BWP."

Structures of the radio frame, the subframe, slot, the mini slot, and the symbol are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, a symbol length, a cyclic prefix (CP) length, and the like can be variously changed.

In the entire present disclosure, for example, when an article such as "a," "an," or "the" in English is added by a translation, the present disclosure may include a case in which a noun following the article is plural.

In the present disclosure, the wording "A and B are different" may mean "A and B are different from each other." Further, the wording may mean "each of A and B is different from C." Terms such as "separated," "coupled," or the like may also be interpreted similarly to "different."

Each aspect/embodiment described in this specification may be used alone, in combination, or may be switched in accordance with the execution. Further, an indication of predetermined information (for example, indication of "being X") is not limited to being performed explicitly, but may be performed implicitly (for example, not indicating the predetermined information).

In the present disclosure, the transmitting unit 210 and the receiving unit 220 are examples of communication units. The transmitting unit 110 and the receiving unit 120 are examples of communication units. The TCI state is an example of a transmission configuration state. The PDSCH is an example of a downlink shared channel.

Although the present disclosure has been described above in detail, it is obvious to those skilled in the art that the present disclosure is not limited to the embodiments described in the present disclosure. The present disclosure may be implemented as revised and modified forms without departing from the gist and scope of the present disclosure as described in the claims. Therefore, the description of the present disclosure is for the purpose of illustration and does not have any restrictive meaning to the present disclosure.

EXPLANATIONS OF LETTERS OR NUMERALS

10 BASE STATION DEVICE
110 TRANSMITTING UNIT
120 RECEIVING UNIT
130 SETTING UNIT
140 CONTROL UNIT
20 USER EQUIPMENT
210 TRANSMITTING UNIT
220 RECEIVING UNIT
230 SETTING UNIT
240 CONTROL UNIT
1001 PROCESSOR
1002 STORAGE DEVICE
1003 AUXILIARY STORAGE DEVICE
1004 COMMUNICATION DEVICE
1005 INPUT DEVICE
1006 OUTPUT DEVICE

The invention claimed is:

1. A terminal comprising:
a receiver that receives, from a base station:
radio resource control (RRC) signaling indicating transmission configuration states related to quasi co-location (QCL) applied to a downlink shared channel;
media access control (MAC) signaling; and
downlink control information (DCI); and
a processor that applies the transmission configuration states to the downlink shared channel based on the RRC signaling, the MAC signaling, and the DCI, wherein
the RRC signaling includes information indicating a first number of transmission configuration states,
the MAC signaling includes information that maps each of a second number of transmission configuration states among the first number of transmission configuration states to a corresponding codepoint, and
the DCI includes a field for indicating the codepoint.

2. The terminal according to claim 1, wherein the MAC signaling maps one or two transmission configurations to a single codepoint.

3. A base station comprising:
a transmitter that transmits, to a terminal:
radio resource control (RRC) signaling indicating transmission configuration states related to quasi co-location (QCL) applied to a downlink shared channel;
media access control (MAC) signaling; and
downlink control information (DCI); and
a processor that applies the transmission configuration states to the downlink shared channel based on the RRC signaling, the MAC signaling, and the DCI, wherein
the RRC signaling includes information indicating a first number of transmission configuration states,
the MAC signaling includes information that maps each of a second number of transmission configuration states among the first number of transmission configuration states to a corresponding codepoint, and
the DCI includes a field for indicating the codepoint.

4. A communication system comprising: a terminal; and a base station, wherein
the terminal includes:
a receiver that receives, from the base station:
radio resource control (RRC) signaling indicating transmission configuration states related to quasi co-location (QCL) applied to a downlink shared channel;
media access control (MAC) signaling; and
downlink control information (DCI); and
a processor of the terminal that applies the transmission configuration states to the downlink shared channel based on the RRC signaling, the MAC signaling, and the DCI, and
the base station includes:
a transmitter that transmits, to the terminal:
the RRC signaling indicating transmission configuration states related to the QCL applied to the downlink shared channel;
the MAC signaling; and
the DCI; and
a processor of the base station that applies the transmission configuration states to the downlink shared channel based on the RRC signaling, the MAC signaling, and the DCI, wherein
the RRC signaling includes information indicating a first number of transmission configuration states,
the MAC signaling includes information that maps each of a second number of transmission configuration states among the first number of transmission configuration states to a corresponding codepoint, and
the DCI includes a field for indicating the codepoint.

5. A communication method comprising:
receiving, by a terminal, from a base station:
radio resource control (RRC) signaling indicating transmission configuration states related to quasi co-location (QCL) applied to a downlink shared channel;
media access control (MAC) signaling; and
downlink control information (DCI); and
applying the transmission configuration states to the downlink shared channel based on the RRC signaling, the MAC signaling, and the DCI, wherein the RRC signaling includes information indicating a first number of transmission configuration states,
the MAC signaling includes information that maps each of a second number of transmission configuration states among the first number of transmission configuration states to a corresponding codepoint, and
the DCI includes a field for indicating the codepoint.

* * * * *